US011085148B2

(12) United States Patent
Keh et al.

(10) Patent No.: US 11,085,148 B2
(45) Date of Patent: Aug. 10, 2021

(54) METHODS AND SYSTEMS FOR DECOLORIZING TEXTILE MATERIALS (71) Applicant: The Hong Kong Research Institute of Textiles and Apparel Limited, Hong Kong (CN)

(72) Inventors: Edwin Yee Man Keh, Hong Kong (CN); Lei Yao, Hong Kong (CN); Alex Chan, Hong Kong (CN); Mimi Hetti, Hong Kong (CN); Yang Liu, Hong Kong (CN); Hung Chan, Hong Kong (CN); Wendy Yu, Hong Kong (CN)

(73) Assignee: Nano and Advanced Materials Institute Limited, Hong Kong (CN)

( * ) Notice: Subject to any disclaimer, the term of this patent is extended or adjusted under 35 U.S.C. 154(b) by 153 days.

(21) Appl. No.: 16/519,036

(22) Filed: Jul. 23, 2019

(65) Prior Publication Data

US 2020/0270807 A1 Aug. 27, 2020

(30) Foreign Application Priority Data

Feb. 22, 2019 (CN) .......................... 201910136278.4

(51) Int. Cl.
*B01J 20/06* (2006.01)
*D06P 5/13* (2006.01)
*B01J 20/20* (2006.01)
*B01J 20/26* (2006.01)
*B01J 20/28* (2006.01)
*B01J 20/32* (2006.01)
*D06B 3/02* (2006.01)
*D06B 1/00* (2006.01)
*D06P 5/15* (2006.01)

(52) U.S. Cl.
CPC .............. *D06P 5/137* (2013.01); *B01J 20/06* (2013.01); *B01J 20/20* (2013.01); *B01J 20/267* (2013.01); *B01J 20/28009* (2013.01); *B01J 20/28016* (2013.01); *B01J 20/3204* (2013.01); *B01J 20/3214* (2013.01); *B01J 20/3236* (2013.01); *B01J 20/3293* (2013.01); *D06B 1/00* (2013.01); *D06B 3/02* (2013.01); *D06P 5/13* (2013.01); *D06P 5/15* (2013.01); *D06P 5/158* (2013.01)

(58) Field of Classification Search
CPC . B01J 20/06; B01J 20/20; B01J 20/267; B01J 20/28009; B01J 20/28016; B01J 20/3204; B01J 20/3236; B01J 20/3293; D06P 5/137; D06P 5/13; D06P 5/15; D06P 5/158; D06B 1/00; D06B 3/02
USPC .......................................................... 61/18 F
See application file for complete search history.

(56) References Cited

U.S. PATENT DOCUMENTS

| | | | |
|---|---|---|---|
| 5,261,925 | A | 11/1993 | Wasinger |
| 7,981,337 | B2 | 7/2011 | Zhang et al. |
| 2014/0068871 | A1 | 3/2014 | Youn |
| 2014/0298590 | A1 | 10/2014 | Fulmer et al. |

FOREIGN PATENT DOCUMENTS

| | | | |
|---|---|---|---|
| CN | 1628192 | A | 6/2005 |
| CN | 201459424 | U | 5/2010 |
| CN | 103709038 | A | 4/2014 |
| CN | 107629245 | A | 1/2018 |
| CN | 207793614 | U | 8/2018 |
| DE | 4333221 | A1 | 4/1995 |
| GB | 297186 | A | 9/1928 |
| JP | 2977546 | B1 | 11/1999 |
| JP | 3232010 | B2 | 11/2001 |
| JP | 2007254904 | A | 10/2007 |
| JP | 2009091701 | A | 4/2009 |
| JP | 2015048570 | A | 3/2015 |

OTHER PUBLICATIONS

International Search Report and Written Opinion of PCT application No. PCT/CN2019/096964 issued from the International Search Authority dated Nov. 20, 2019.
Partial European Search Report of EP application No. 19187598.8 issued from the European Patent Office dated Feb. 10, 2020.

*Primary Examiner* — Edward M Johnson
(74) *Attorney, Agent, or Firm* — Spruson & Ferguson (Hong Kong) Limited (57) ABSTRACT

Provided herein is a method for decolorizing textile materials under hydrothermal conditions using dye adsorbent materials. The process is non-toxic and environmentally friendly, and the adsorbent materials can be repeatedly used. The textile materials are textile materials dyeable with disperse dyes. Further provided is a system for decolorizing textile materials. The decolorization system is designed to allow the adsorbent materials to react with the textile materials in a contact manner and a non-contact manner.

7 Claims, 4 Drawing Sheets

METHODS AND SYSTEMS FOR DECOLORIZING TEXTILE MATERIALS

CROSS-REFERENCE TO RELATED APPLICATIONS

This application claims the benefit of priority of Chinese Patent Application Number 201910136278.4, filed on Feb. 22, 2019, the contents of which being hereby incorporated by reference in their entirety for all purposes.

TECHNICAL FIELD

The present disclosure relates to a method and system for decolorizing textile materials. In particular, the present disclosure relates to a method and system for decolorizing textile materials, dyed with disperse dyes, under hydrothermal environment using dye adsorbent materials.

BACKGROUND

Textile waste is one of the fastest growing waste streams in many countries. It not only pollutes the environment, but also wastes resources if the textile waste is incinerated instead. With an increased awareness of environmental issues, more attention is being focused on recycling of textile waste. It has become an important issue to recycle synthetic fibers, such as widely used polyesters and nylons, in the textile industry. However, decolorization of such materials is often times necessary prior to reuse, and it is also an urgent problem to be solved in the field of recycling at present.

Traditional methods for decolorizing textile materials primarily include bleaching and solvent extraction. Chemical bleaching is widely used. For example, Japanese patent application No. JP2007254904A, U.S. Pat. No. 7,981,337B2, Chinese patent application No. CN1628192A, Japanese patent No. JP3232010B2, U.S. Pat. No. 5,261,925A and US patent application No. US20140068871A1 involve chemical bleaching. They use different kinds of oxidizing or reducing agents, including ozone, hydrosulfite, thiourea dioxide, $NO_x$, $SO_x$, hydrogen peroxide, reducing sugars, and phosphorus oxoacids, to decolorize the textile materials. In addition, JP2007254904A also involves a non-ionic surfactant in the formulation. Chemical bleaching is generally not preferred, because it involves reactive chemicals and will generate a large amount of waste water. And some kinds of bleaching reagents will even damage the fiber structure of the textile materials. Decoloration with solvent extraction has also been reported. Japanese patent application No. JP2015048570A discloses a method in which dyes within the textile materials are extracted into some solvents (such as octanol and xylene) and are removed. Chinese utility model patent No. CN201459424U provides a device for destroying or removing dyes within the polyester textile materials, wherein an autoclave device allows octanol vapor to contact the textile materials so as to extract and wash off the dye molecules under reflux conditions, and the used solvent can be reused after purification by distillation. However, application of solvent extraction methods is limited due to the use of large amounts of non-renewable, toxic and harmful petroleum solvents.

Referring to any of the reference documents in any other parts of the present application should not be interpreted as an admission of the cited reference document(s) being the prior art of the present application.

SUMMARY

In order to solve the problems existing in the prior art, the present disclosure provides a method and system for decolorizing textile materials. Specifically, the present disclosure provides a method and system for decolorizing textile materials, dyed with disperse dyes, under hydrothermal conditions using dye adsorbent materials.

The method and system described herein are found to demonstrate effective dye removal from the textile materials (especially textile materials dyed with disperse dyes) and reduction of color intensity of the textiles, with average decolorizing rates up to 94%. Meanwhile, the method of the present disclosure uses water as the decolorization solvent, which avoids the use of organic solvents or chemical reagents that are commonly used in the traditional chemical bleaching methods, and thus is a safe, non-toxic, environment-friendly and effective method for decolorization. The decolorizing method and system according to the present disclosure enable the textile materials to retain their original structures after decolorization with their color intensity significantly reduced and residual dyes decreased. Particularly, the used adsorbent materials can be used repeatedly for many times. Therefore, the method and the system according to the present disclosure have great application value and development potential.

In one aspect, the present disclosure provides a method for decolorizing textile materials, comprising:
(a) providing textile materials;
(b) providing dye adsorbent materials; and
(c) decolorizing the textile materials, comprising:
   (c1) treating the textile materials under hydrothermal condition in a decolorization reactor in the case where the textile materials are in contact with the dye adsorbent materials, so as to at least partially decolorize the textile materials, and separating the at least partially decolorized textile materials from the dye adsorbent materials; or
   (c2) treating the textile materials under hydrothermal condition in a decolorization reactor in the case where the textile materials are not in contact with the dye adsorbent materials, so as to at least partially decolorize the textile materials, collecting a liquid containing dye molecules desorbed from the textile materials from the decolorization reactor, and contacting the collected liquid with the dye adsorbent materials.

In some embodiments, the textile materials are textile materials dyeable with disperse dyes, for example any of polyester, nylon and acrylic fibers, or any combination thereof.

In some embodiments, the textile materials are treated at a temperature of about 100° C. to about 170° C. In some embodiments, the textile materials are treated for about 0.5 hours to about 8 hours.

In some embodiments, the dye adsorbent materials are selected form the group consisting of activated carbon (AC), cross-linked polystyrene (PS), activated alumina, molecular sieve and any combination thereof, preferably activated carbon and/or cross-linked polystyrene. In some embodiments, the dye adsorbent materials have a particle size of from about 3.5 meshes to about 100 meshes, preferably from about 12 meshes to about 60 meshes. In some embodiments, the above-described dye adsorbent materials are magnetized dye adsorbent materials, including magnetized activated carbon, magnetized molecular sieve or the like, preferably magnetized activated carbon.

In some embodiments, said treating the textile materials under hydrothermal condition in steps (c1) and (c2) further comprise: stirring the materials in the decolorization reactor, so as to promote separation of the dye molecules from the textile materials and dispersion thereof into water.

In some embodiments, said separating the at least partially decolorized textile materials from the dye adsorbent materials in step (c1) comprises separating the at least partially decolorized textile materials from the magnetized dye adsorbent materials using a magnetic field. In some embodiments, the separated dye adsorbent materials are recovered, cleaned and dried, and are reused in a decolorizing reaction of the textile materials.

In some embodiments, in step (c2), the liquid containing dye molecules desorbed from the textile materials is collected in a non-continuous manner or a continuous manner, preferably in a continuous manner. In some embodiments, the method further comprises, after contacting the collected liquid with the dye adsorbent materials, adding the liquid treated by the dye adsorbent materials into the decolorization reactor again.

In some embodiments, the method further comprises step (d): filtering (by, e.g., a filtration device, such as a screen or a hydrocyclone), cleaning and collecting the at least partially decolorized textile materials.

In some embodiments, the ratio of the textile materials to the dye adsorbent materials ranges from about 1:0.1 (w/w) to about 1:100 (w/w), preferably from about 1:0.5 (w/w) to about 1:10 (w/w). In some embodiments, the ratio of the textile materials to water ranges from about 1:20 (w/v) to about 1:500 (w/v), preferably from about 1:50 (w/v) to about 1:200 (w/v).

In some embodiments, the water used under the hydrothermal condition is deionized water or distilled water.

In some embodiments, an average decolorizing rate of 94% can be achieved with the decolorizing method according to the present disclosure.

In some embodiments, a synthetic method of the magnetized dye adsorbent materials comprises:
dissolving iron (II) chloride and iron (III) chloride into deionized water;
adding particles of the dye adsorbent materials and a concentrated ammonium solution to form a precipitate; and
treating the precipitate by heating to obtain the magnetized dye adsorbent materials.

In some embodiments, the synthetic method of the magnetized dye adsorbent materials further comprises: cleaning the resulting magnetized dye adsorbent materials.

In some embodiments, the mole ratio of the iron (II) chloride to the iron (III) chloride is about 1:2. In some embodiments, the mass ratio of the iron (II) and the iron (III) to the deionized water ranges from about 1:1 to about 1:200, preferably from about 1:10 to about 1:100. In some embodiments, the mass ratio of the added dye adsorbent materials to the deionized water ranges from about 1:1 to about 1:100, preferably from about 1:5 to about 1:10. In some embodiments, the concentrated ammonium solution has a concentration ranging from about 1M to about 10M, preferably from about 2M to about 5M. In some embodiments, the precipitate is heat treated at a temperature of about 50° C. to about 200° C., preferably about 120° C. to about 150° C. In addition, the precipitate is heated for about 5 mins to about 120 mins, preferably about 30 mins to about 90 mins.

In another aspect, the present disclosure provides a decoloration system for decolorizing textile materials, comprising:

a decolorization reactor (1) for treating the textile materials under hydrothermal condition so as to at least partially decolorize the textile materials, wherein the decolorization reactor is provided with a feed inlet (11) and an outlet (12) and is configured to accommodate water, the textile materials and optional dye adsorbent materials;

a heating device (2) for providing a heat source to the decolorization reactor; and a filtration device (3) for filtering and collecting the at least partially decolorized textile materials, wherein the filtration device (3) is connected to the outlet (12) of the decolorization reactor (1) via a first valve (4), wherein:
(i) in the case where the decolorization reactor (1) is configured to accommodate water, the textile materials and the dye adsorbent materials, the decolorization system further comprises:
a separation device (7) for separating and collecting the dye adsorbent materials; or
(ii) in the case where the decolorization reactor (1) is configured to accommodate water and the textile materials, the decolorization system further comprises:
an adsorption device (31) configured to accommodate the dye adsorbent materials, wherein the adsorption device (31) is in fluid communication with the decolorization reactor (1) so as to receive liquid containing dye molecules desorbed from the textile materials collected from the decolorization reactor (1), and to allow the dye adsorbent materials to contact with the liquid.

In some embodiments, the decolorization system further comprises: a stirring device (8) for promoting the dye molecules within the textile materials being separated from the textile materials and dispersed into water, wherein the stirring device (8) comprises a stirrer (5) and optionally an ultrasonic probe (6). Preferably, the stirring device (8) comprises a stirrer (5) and an ultrasonic probe (6). In some embodiments, the decolorization system further comprises an ultrasonic generator (9) for driving the ultrasonic probe (6).

In some embodiments, the decolorization system further comprises: a temperature detector (13) and a pressure detector (14), which are used to detect the temperature and pressure in the decolorization reactor (1) during decolorizing reaction, respectively.

In some embodiments, the separation device (7) is disposed outside the decolorization reactor (1) and comprises at least one (which may be two or more) magnetic field generator(s), and wherein the dye adsorbent materials are magnetized dye adsorbent materials.

In some embodiments, the adsorption device (31) is disposed in a circulation loop that is in fluid communication with the decolorization reactor (1), and the circulation loop further comprises a liquid collector (21) and at least one circulation pump (22, 32), wherein the liquid collector (21), the at least one circulation pump (22, 32) and the adsorption device (31) are in fluid communication.

In some embodiments, the circulation loop comprises a first circulation loop (20) and a second circulation loop (30), wherein:
the first circulation loop (20) comprises the liquid collector (21) and a first circulation pump (22), and the first circulation loop (20) is in fluid communication with the decolorization reactor (1); and
the second circulation loop (30) comprises the adsorption device (31), a second circulation pump (32) and optionally an observation hole (33), and the second circulation loop (30) is in fluid communication with the liquid collector (21).

In some embodiments, the adsorption device (31) comprises at least one, for example two, three or more, adsorption column(s) (34), as well as a second valve (35) and a third valve (36) connected at both ends of the adsorption column (34), wherein the adsorption column (34) is configured to accommodate the dye adsorbent materials.

In some embodiments, the heating device (2) is any one of a steam heating device, an electric heating device, or a microwave heating device or any combination thereof.

In another aspect, the present disclosure provides a contact type decolorizing method, comprising the following steps:
  (a) providing textile materials;
  (b) providing dye adsorbent materials; and
  (c) decolorizing the textile materials in a contact type decolorization system, wherein the contact type decolorization system comprises:
    a decolorization reactor (1) provided with a feed inlet (11) and an outlet (12);
    a heating device (2) for providing a heat source to the decolorization reactor;
    a filtration device (3) connected to the outlet (12) of the decolorization reactor (1) via a first valve (4); and
    a separation device (7) for separating and collecting the dye adsorbent materials,
  and wherein the step (c) comprises:
    (ci) adding water, the textile materials and the dye adsorbent materials into the decolorization reactor (1);
    (cii) treating the textile materials under hydrothermal condition to at least partially decolorize the textile material; and
    (ciii) separating the at least partially decolorized textile materials from the dye adsorbent materials.

In some embodiments, the dye adsorbent materials are magnetized dye adsorbent materials, and the separation device (7) is disposed outside the decolorization reactor (1) and comprises at least one magnetic field generator(s).

In another aspect, the present disclosure provides a non-contact type decolorizing method, comprising the following steps:
  (a) providing textile materials;
  (b) providing dye adsorbent materials; and
  (c) decolorizing the textile materials in a non-contact type decolorization system, wherein the non-contact type decolorization system comprises:
    a decolorization reactor (1) provided with a feed inlet (11) and an outlet (12);
    a heating device (2) for providing a heat source to the decolorization reactor;
    a filtration device (3) connected to the outlet (12) of the decolorization reactor (1) via a first valve (4); and
    an adsorption device (31) in fluid communication with the decolorization reactor (1),
  and wherein the step (c) comprises:
    (ci) adding water and the textile materials into the decolorization reactor (1), and adding the dye adsorbent materials into the adsorption device (31);
    (cii) treating the textile materials under hydrothermal condition to at least partially decolorize the textile materials;
    (ciii) collecting liquid containing dye molecules desorbed from the textile materials from the decolorization reactor (1); and
    (ciii) contacting the collected liquid with the dye adsorbent materials.

In some embodiments, the adsorption device (31) of the non-contact type decolorization system of the present disclosure is defined as above.

In some embodiments, the step (cii) in the contact type decolorizing method and the non-contact type decolorizing method further comprises: stirring the materials in the decolorization reactor so as to promote the dye molecules within the textile materials to separate from the textile materials and disperse into water.

In some embodiments, both the contact type decolorizing method and the non-contact type decolorizing method further comprise step (d): filtering, cleaning and collecting the at least partially decolorized textile materials via, e.g., the filtration device (3).

In another aspect, the present disclosure provides uses of the textile pieces decolorized by the method or system described above.

In some embodiments, the decolorized textile pieces of the present disclosure can be re-dyed so as to obtain a textile product dyed with fashion color(s), thereby reducing the overstocked inventory due to unfavored colors. In some other embodiments, the cloths of the decolorized textile materials of the present disclosure can be further recycled, upgraded, and reprocessed so as to prepare various textile products. The textile pieces decolorized by the decolorizing method and the decolorization system according to the present disclosure are able to retain their original structures, with their color intensity significantly reduced and residual dyes decreased. Particularly, the used adsorbent materials can be reused for multiple times. Therefore, the method and the system according to the present disclosure have great application value and development potential.

Other aspects and advantages of the present invention will become apparent to those skilled in the art from reading the following description.

BRIEF DESCRIPTION OF THE DRAWINGS

The above objects and features as well as other objects and features of the present disclosure will become apparent from the following description of the present invention in conjunction with the accompanying drawings, wherein.

DETAILED DESCRIPTION

The scope of the present disclosure is not limited to any specific embodiment described herein. The following embodiments are provided only for illustration.

Figure 1:
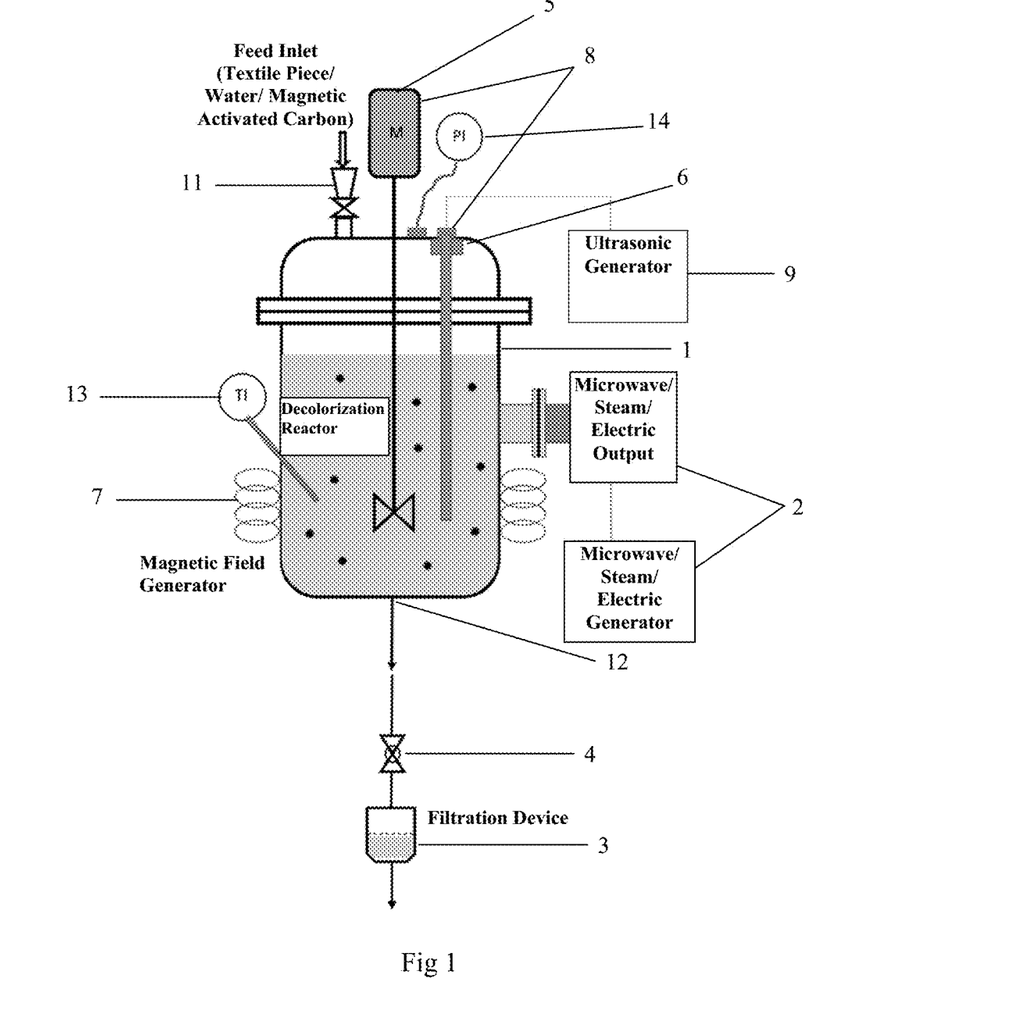
FIG. 1 is a schematic diagram showing a contact type decolorization system according to certain embodiments of the present disclosure.

As shown in FIG. 1, during the process of decolorization treatment in the contact type decolorization system, textile cloths, magnetic adsorbent materials and deionized water are added in a certain ratio into the decolorization reactor (1) via feed inlet (11), and the stirrer (5) is started at the same time to stir the mixture. Under autogenic pressure, the materials in the decolorization reactor (1) are heated to about 100° C. to 170° C. by the heating device (2). Optionally, the ultrasonic generator (9) is started to drive the ultrasonic probe (6), thereby accelerating dispersion of the dye molecules from the textile materials into the water. During decolorizing reaction, the temperature detector (13) and pressure detector (14) may be used to respectively detect the temperature and pressure during the reaction. After reaction, the magnetic field generator (7) is started to generate magnetic field, so as to separate the magnetic dye adsorbent materials from the textile materials. The magnetic adsorbent materials are collected, cleaned and dried, and they may be reused in the decolorizing method according to the present invention until saturation and no decolorizing effect is achieved. The textile materials enter into the filtration device (3) via outlet (12) and the first valve (4) after decolorization. After filtration, the decolorized textile materials are collected and dried for further applications.

Figure 2:
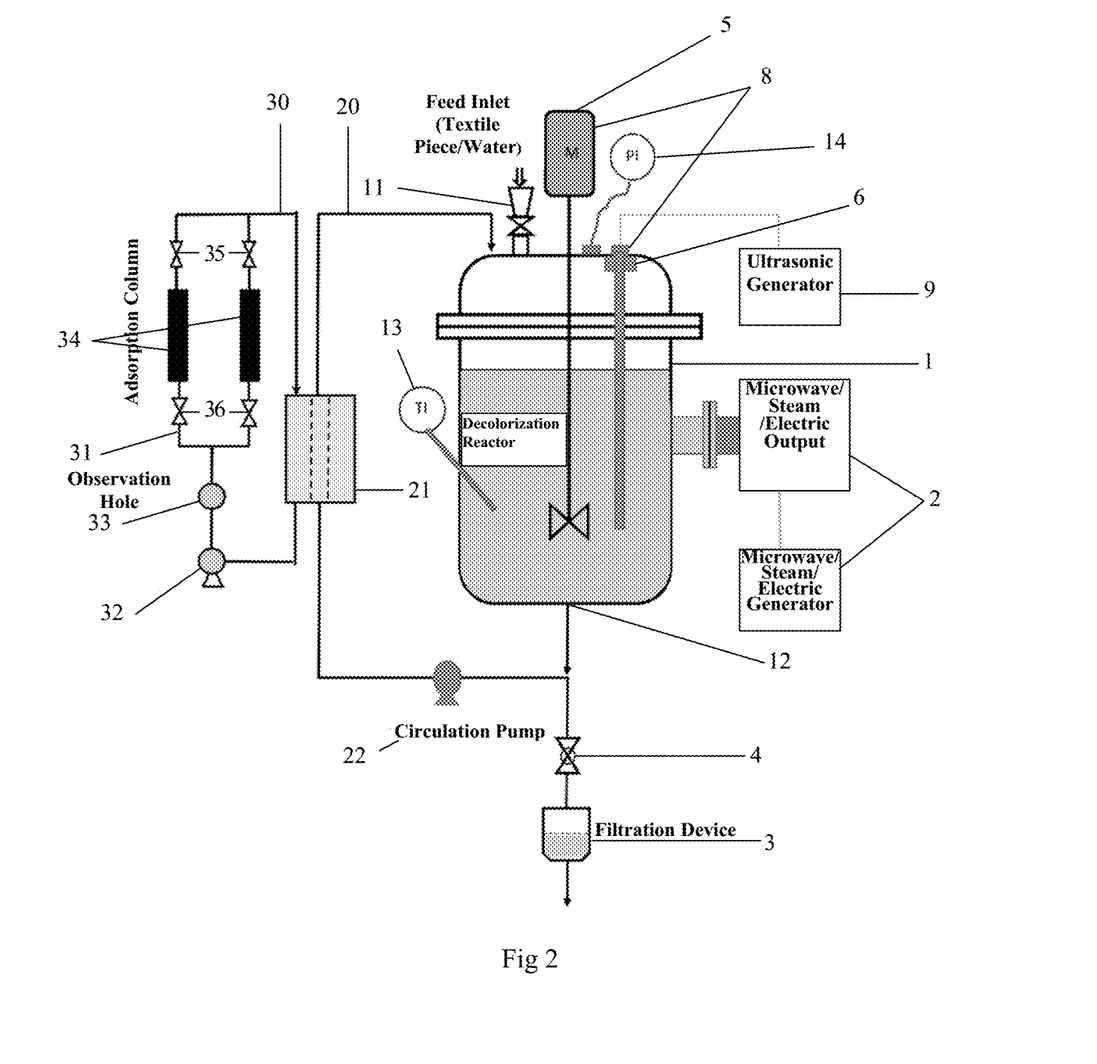
FIG. 2 is a schematic diagram showing a non-contact type decolorization system according to certain embodiments of the present disclosure.

As shown in FIG. 2, during the process of decolorization treatment in the non-contact type decolorization system, dye adsorbent materials are loaded into the adsorption column (34), and textile pieces and deionized water is added in a certain ratio into the decolorization reactor (1) via feed inlet (11). The stirrer (5) is started at the same time to stir the mixture. Under autogenic pressure, the materials in the decolorization reactor (1) are heated to about 100° C. to 170° C. by the heating device (2). Optionally, the ultrasonic generator (9) is started to drive the ultrasonic probe (6), thereby accelerating dispersion of the dye molecules from the textile materials into water. During decolorizing reaction, the temperature detector (13) and pressure detector (14) may be used to respectively detect the temperature and pressure during the reaction. Liquid containing dye molecules desorbed from the textile pieces in the decolorization reactor (1) flow through the first circulation loop (20) and second circulation loop (30) via outlet (12), and pass through the adsorption column (34). The adsorption column (34) can adsorb dye molecules from the liquid passed through. The liquid processed by the adsorption column (34) flows back into the liquid collector (21) through the piping, and then into the decolorization reactor (1). Under the action of circulation pumps (22, 32), the mixture of dye molecules dispersed in the water is able to circulate through the piping. During this period, the color of the water may be observed through the observation hole (32), and the degree of saturation of the adsorbent materials is thereby judged. After decolorization, the decolorized textile materials enter into the filtration device (3) via the outlet (12) and the first valve (4). After filtration, the decolorized textile materials are collected and dried for further applications. The used water and the dye adsorbent materials in the adsorption column can be reused until the dye adsorbent materials are saturated and no decolorizing effect is achieved. When the dye adsorbent materials are saturated and no decolorizing effect is achieved, the adsorption column may be replaced so as to proceed with the decolorizing process.

Compared with the existing methods and systems, the decolorizing method and/or the decolorization system according to the present disclosure enable high dye removal rates and are able to remove the dye molecules from the textile materials more effectively in a shorter time period. Moreover, the color intensity of the decolorized textile materials is significantly reduced and residual dyes reduced. Meanwhile, since water is used as the decolorization solvent, and neither toxic and harmful chemical reagents nor acid and alkali organic solvents are used during decolorization, the decolorizing method and the decolorization system according to the present disclosure will not destroy the structural integrity of the textile materials, and are not harmful to the environment, which is beneficial to environment and human health. Therefore, the decolorizing method and/or the decolorization system according to the present disclosure are able to produce decolorized textile materials recoverable at a higher rate, and thus have greater application value in many aspects.

Unless otherwise specified in the context, the term "comprise", "include" or "contain" as used throughout the specification and claims should be construed as implicitly including the elements, components or features as recited, or a group of the elements, components or features, without excluding any other elements, components or features, or a group of the other elements, components or features.

Unless otherwise defined, all the other technical terms used herein have the same meanings as those generally understood by those skilled in the art to which the present invention pertains.

Example 1. Decolorizing Textile Materials with Magnetic Activated Carbon in a Contact Type Decolorization System 2 g of magnetic activated carbon particles, 100 ml of deionized water and 2 g of textile piece were added into a 350 ml decolorization reactor of the contact type decolorization system as shown in FIG. 1. The mixture was steam heated to 130° C., 140° C. and 150° C., respectively, and stirred for 3 hours. After reaction, the magnetic field generator was started to adsorb and collect the magnetic activated carbon particles, and the textile materials were filtered, cleaned and dried.

The color intensities (K/S values) of the textile materials were measured by an X-Rite UV/VIS spectrophotometer before and after decolorization; and percentage of color intensity reduction were calculated. Table 1 shows the K/S values of various textile materials before and after decolorization at different temperatures as well as decolorizing rates thereof.

TABLE 1 the K/S values before and after decolorization at different temperatures and the percentage of color intensity reduction

| Textile materials | Treatment temperature (° C.) | K/S values before treatment | K/S values after treatment | Color reduction (%) |
|---|---|---|---|---|
| Sample 1 (red knitted cloth) | 130 | 9.66 | 0.50 | 95 |
| Sample 2 (yellow knitted cloth) | | 5.40 | 0.34 | 94 |
| Sample 3 (red woven cloth) | 140 | 22.71 | 1.56 | 93 |
| Sample 4 (yellow woven cloth) | | 1.21 | 0.12 | 90 |
| Sample 5 (red woven cloth) | 150 | 7.19 | 0.24 | 97 |
| Sample 6 (yellow woven cloth) | | 4.50 | 0.21 | 95 |

As can be seen from the experimental results, after decolorization, the color intensities of the textile materials were greatly reduced to very pale or even white, with the reduction of color intensity up to above 90%.

Figure 4:
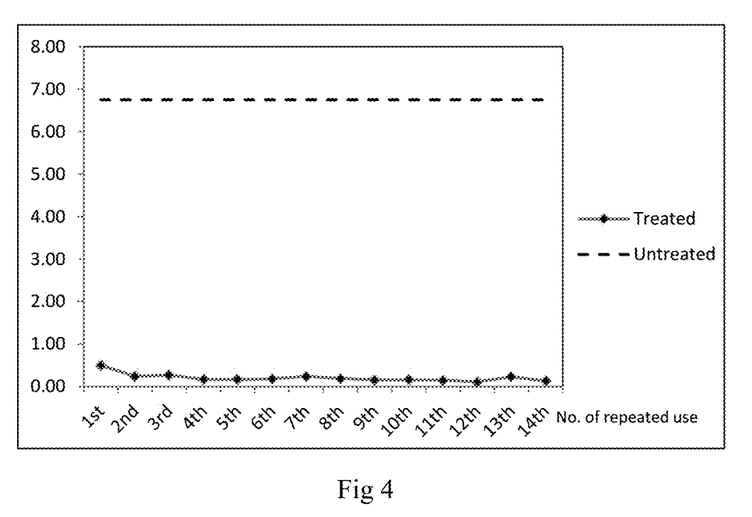
FIG. 4 shows a graph showing the K/S value of textile cloths against the number of repeated use of the activated carbon particles.

In order to further demonstrate the reusability of the magnetic activated carbon particles during the decolorizing process, red woven cloths were decolorized as described above. The used magnetic activated carbon particles were reused in the decolorizing process multiple times, with the repetition number of greater than 10. The K/S values of the cloths were measured after each decolorization treatment. The K/S values of the textile materials against the number of repeated use of the magnetic activated carbon particles were plotted and shown in FIG. 4. As can be seen, the same magnetic activated carbon particles can be reused more than ten times without weakening the decolorizing effect.

Example 2. Decolorizing Textile Materials with Activated Carbon Particles in a Non-Contact Type Decolorization System 1 g of activated carbon particles, 100 ml of deionized water and 1 g of colored textile cloths were added into the adsorption column and the decolorization reactor of the non-contact type decolorization system as shown in FIG. 2, respectively. The decolorization reactor had a volume of 350 ml. The mixture was electrically heated to 150° C., and stirred and ultrasonic-processed for 4 hours. After reaction, the textile materials were taken out of the mixture, cleaned and dried.

The color intensities (K/S values) of the textile materials before and after decolorization were measured by an X-Rite UV/VIS spectrophotometer; and the percentage of color intensity reduction were calculated. Table 2 shows the K/S values of various textile materials before and after decolorization, as well as color intensity reduction percentage thereof.

TABLE 2 the K/S values before and after decolorization and the decolorizing rates

| Textile materials | Treatment temperature (° C.) | K/S values before treatment | K/S values after treatment | Color reduction (%) |
|---|---|---|---|---|
| Sample 1 (red knitted cloth) | 150 | 9.66 | 0.13 | 99 |
| Sample 2 (yellow woven cloth) | | 4.50 | 0.12 | 97 |
| Sample 3 (blue knitted cloth) | | 10.28 | 0.14 | 99 |
| Sample 4 (red woven cloth) | | 7.19 | 0.18 | 97 |
| Sample 5 (yellow knitted cloth) | | 5.40 | 0.11 | 98 |

Figure 3:
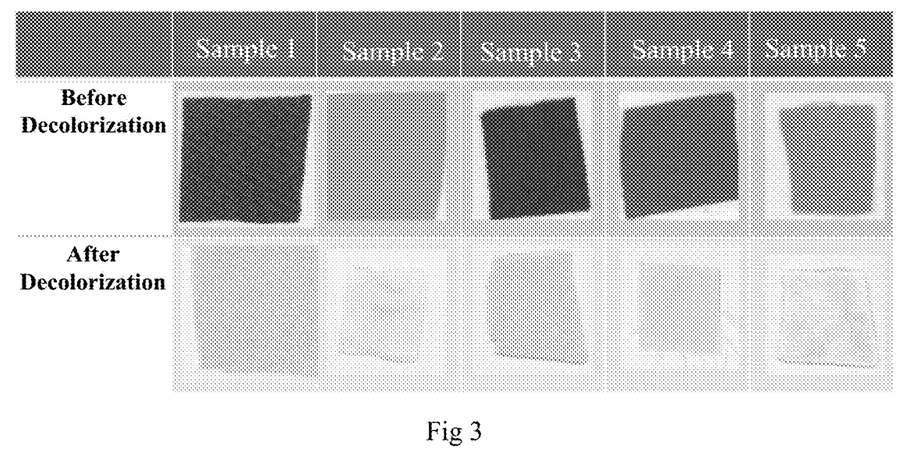
FIG. 3 shows the photos of the pieces of the textile materials before and after decolorization by activated carbon according to an example of the present disclosure.

FIG. 3 shows photos of some of the textile pieces before and after decolorization.

As can be seen from the experimental results, after decolorization, the color intensities of the textile materials were greatly reduced to very pale or even white, with the reduction of color intensity up above 90%.

Example 3. Decolorize Polyester Cloths with Cross-Linked Polystyrene Beads in a Non-Contact Type Decolorization System 2 g of cross-linked polystyrene (PS) beads, 0.1 g of black polyester woven textile piece and 150 ml of deionized water were added into the decolorization reactor of the non-contact type decolorization system as shown in FIG. 2. The decolorization reactor was heated to 140° C. using microwave irradiation, and ultrasonic treatment was performed for 1 hour. After reaction, the polyester cloth was taken out from the mixture.

Figure 5:
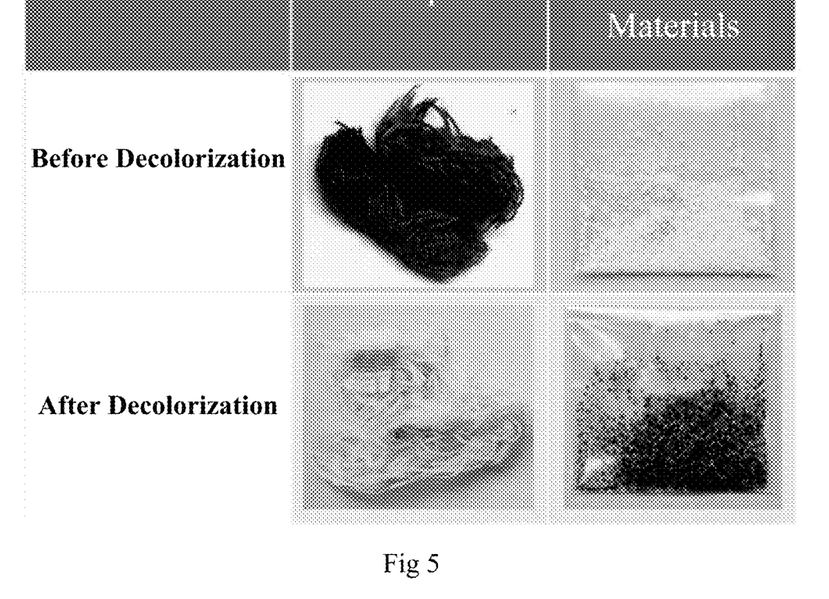
FIG. 5 shows the photos of PS beads before and after decolorization, and photos of polyester cloths before and after decolorization.

FIG. 5 shows photos of the cross-linked PS beads before and after decolorization, and of the polyester textile pieces before and after decolorization. After reaction, the color of the PS beads changed from colorless to dark, while the color of the polyester cloth remarkably turned pale. This suggests that the cross-linked PS beads were able to effectively eliminate the dye molecules from the polyester textile piece.

Example 4. Synthesis of Magnetic Activated Carbon Particles 0.60 g of iron (II) chloride tetrahydrate ($FeCl_2.4H_2O$) and 1.62 g of iron (III) chloride hexahydrate ($FeCl_3.6H_2O$) were dissolved in 5 ml of deionized water. After 10 g of activated carbon particles were added, 3M ammonium solution was added dropwise into the mixture of Fe/activated carbon particles. The mixture solution was placed into an oven at 150° C. for 20 mins. The resultant magnetic activated carbon particles were collected, and washed with deionized water several times, followed by drying, giving magnetic activated carbon particles containing 2.0% of iron oxides.

Figure 6:
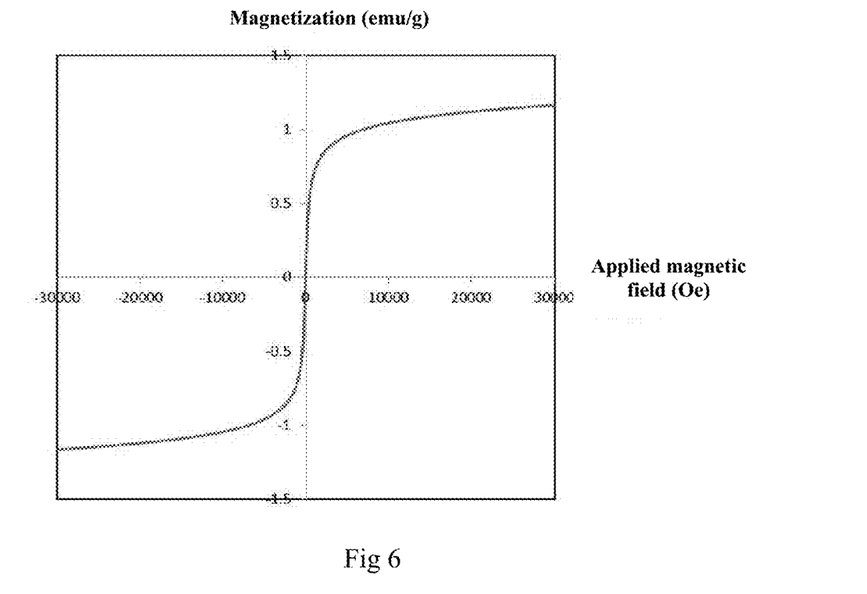
FIG. 6 shows a typical magnetization-magnetic field (M-H) curve of magnetic activated carbon particles.

FIG. 6 shows the typical magnetization-magnetic field (M-H) curve of the magnetic activated carbon particles. As can be seen from FIG. 6, the saturation magnetization ($M_s$) of the magnetic activated carbon particles was 1.16 emu/g.

The above examples are described to facilitate understanding and application of the present invention by those skilled in the art. Those skilled in the art apparently may readily make various modifications to these examples, and apply the general principles described herein to other examples without creative work. Therefore, the present invention is not limited to the specific examples disclosed herein, and any improvements and modifications made by those skilled in the art according to the principles of the present disclosure without departing from the scope of the present disclosure should fall within the scope of protection of the present invention.

What is claimed is:

1. A decolorization system for decolorizing textile materials, comprising:
   a decolorization reactor (1) for treating the textile materials under hydrothermal conditions so as to at least partially decolorize the textile materials, wherein the decolorization reactor is provided with a feed inlet (11) and an outlet (12) and is configured to accommodate water, the textile materials and optional dye adsorbent materials;
   a heating device (2) for providing a heat source to the decolorization reactor;
   a filtration device (3) for filtering and collecting the at least partially decolorized textile materials, wherein the filtration device (3) is connected to the outlet (12) of the decolorization reactor (1) via a first valve (4), wherein:
     (i) in the case where the decolorization reactor (1) is configured to accommodate water, the textile materials and the dye adsorbent materials, the decolorization further comprises:
       a separation device (7) for separating and collecting the dye adsorbent materials; or (ii) in the case where the decolorization reactor (1) is configured to accommodate water and the textile material, the decolorization system further comprises:

an adsorption device (31) configured to accommodate the dye adsorbent materials, wherein the adsorption device (31) is in fluid communication with the decolorization reactor (1) so as to receive a liquid containing dye molecules desorbed from the textile materials collected from the decolorization reactor (1), and to allow the dye adsorbent materials to contact with the liquid.

2. The decolorization system according to claim 1 further comprising:

a stirring device (8) for promoting the dye molecules within the textile materials being separated from the textile materials and dispersed into water, wherein the stirring device (8) comprises a stirrer (5) and optionally an ultrasonic probe (6).

3. The decolorization system according to claim 1, wherein the separation device (7) is disposed outside the decolorization reactor (1) and comprises at least one magnetic field generator, and the dye adsorbent materials are magnetized dye adsorbent materials.

4. The decolorization system according to claim 1, wherein:

the adsorption device (31) is disposed in a circulation loop that is in fluid communication with the decolorization reactor (1), and the circulation loop further comprises a liquid collector (21) and at least one circulation pump (22, 32), wherein the liquid collector (21), the at least one circulation pump (22, 32) and the adsorption device (31) are in fluid communication.

5. The decolorization system according to claim 4, wherein:

the circulation loop comprises a first circulation loop (20) and a second circulation loop (30), wherein, the first circulation loop (20) comprises the liquid collector (21) and a first circulation pump (22), and the first circulation loop (20) is in fluid communication with the decolorization reactor (1); and the second circulation loop (30) comprises the adsorption device (31), a second circulation pump (32) and optionally an observation hole (33), and the second circulation loop (30) is in fluid communication with the liquid collector (21).

6. The decolorization system according to claim 1, wherein the adsorption device (31) comprises at least one adsorption column (34), and a second valve (35) and a third valve (36) connected to both ends of the adsorption column (34), wherein the adsorption column (34) is configured to accommodate the dye adsorbent materials.

7. The decolorization system according to claim 1, wherein the heating device (2) is one of a steam heating device, an electric heating device, a microwave heating device or any combination thereof.

* * * * *

UNITED STATES PATENT AND TRADEMARK OFFICE
CERTIFICATE OF CORRECTION

| | |
|---|---|
| PATENT NO. | : 11,085,148 B2 |
| APPLICATION NO. | : 16/519036 |
| DATED | : August 10, 2021 |
| INVENTOR(S) | : Edwin Yee Man Keh et al. |

It is certified that error appears in the above-identified patent and that said Letters Patent is hereby corrected as shown below:

On the Title Page

Column 1, In the item (73) – Assignee, the correct Assignee's Name should be The Hong Kong Research Institute of Textiles and Apparel Limited.

Signed and Sealed this
Tenth Day of May, 2022

Katherine Kelly Vidal
*Director of the United States Patent and Trademark Office*